United States Patent
Krause

(10) Patent No.: US 11,073,986 B2
(45) Date of Patent: Jul. 27, 2021

(54) MEMORY DATA VERSIONING

(71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 758 days.

(21) Appl. No.: 15/109,375

(22) PCT Filed: Jan. 30, 2014

(86) PCT No.: PCT/US2014/013735
§ 371 (c)(1),
(2) Date: Jun. 30, 2016

(87) PCT Pub. No.: WO2015/116078
PCT Pub. Date: Aug. 6, 2015

(65) Prior Publication Data
US 2016/0328153 A1     Nov. 10, 2016

(51) Int. Cl.
*G06F 12/08* (2016.01)
*G06F 12/0808* (2016.01)
(Continued)

(52) U.S. Cl.
CPC .......... *G06F 3/0604* (2013.01); *G06F 3/0629* (2013.01); *G06F 3/0673* (2013.01);
(Continued)

(58) Field of Classification Search
CPC ........ G06F 3/0604; G06F 3/06; G06F 3/0673; G06F 3/0629; G06F 12/1009; G06F 12/08; G06F 9/46; G06F 9/466
(Continued)

(56) References Cited

U.S. PATENT DOCUMENTS 6,574,705 B1 * 6/2003 Peloquin ............... G06F 3/0601
707/999.202
6,782,410 B1 * 8/2004 Bhagat .................. G06F 9/5027
709/201
(Continued)

FOREIGN PATENT DOCUMENTS

TW    200929946 A    7/2009
TW    201106354 A    2/2011
WO    WO-2013130106    9/2013

OTHER PUBLICATIONS

International Searching Authority, The International Search Report and the Written Opinion, dated Oct. 27, 2014, 14 Pages.
(Continued)

*Primary Examiner* — Mohamed M Gebril
(74) *Attorney, Agent, or Firm* — Hewlett Packard Enterprise Patent Department

(57) ABSTRACT

A memory management unit receives a transaction request to perform an operation with respect to data in memory, the transaction request including control information. The memory management unit identifies, based on the control information, one of a plurality of versions of a given memory data, where the plurality of versions of the given memory data include a first version of the given memory data and a second version of the given memory data that is modified from the first version. The memory management unit accesses the identified version of the given memory data in response to the transaction request.

14 Claims, 5 Drawing Sheets

(51) Int. Cl.
*G06F 12/0815* (2016.01)
*G06F 3/06* (2006.01)
*G06F 12/1009* (2016.01)
*G06F 12/00* (2006.01)
*G06F 9/46* (2006.01)

(52) U.S. Cl.
CPC .............. *G06F 9/466* (2013.01); *G06F 12/00* (2013.01); *G06F 12/1009* (2013.01)

(58) Field of Classification Search
USPC ........................................................ 711/154
See application file for complete search history.

(56) References Cited

U.S. PATENT DOCUMENTS

| | | | | |
|---|---|---|---|---|
| 6,842,377 B2* | 1/2005 | Takano | ................ | G11C 7/1021 365/185.21 |
| 7,017,011 B2* | 3/2006 | Lesmanne | ............. | G06F 12/082 711/141 |
| 7,065,630 B1 | 6/2006 | Ledebohm et al. | | |
| 7,196,942 B2* | 3/2007 | Khurana | ............... | G11C 7/1051 326/38 |
| 7,269,715 B2* | 9/2007 | Le | ......................... | G06F 9/3802 712/215 |
| 7,321,955 B2* | 1/2008 | Ohmura | ............... | G06F 12/0804 711/113 |
| 7,512,736 B1* | 3/2009 | Overby | ................ | G06F 3/0607 707/999.202 |
| 8,230,193 B2* | 7/2012 | Klemm | ................ | G06F 3/0608 711/114 |
| 8,347,010 B1* | 1/2013 | Radovanovic | .......... | G06F 13/38 710/2 |
| 8,443,166 B2* | 5/2013 | Czezatke | ............ | G06F 11/1451 711/203 |
| 8,566,546 B1* | 10/2013 | Marshak | ............... | G06F 3/0604 711/112 |
| 8,984,031 B1* | 3/2015 | Todd | ................. | G06F 17/30091 707/823 |
| 8,990,527 B1* | 3/2015 | Linstead | ............... | G06F 3/0617 711/161 |
| 2003/0212859 A1* | 11/2003 | Ellis | ..................... | G06F 3/0613 711/114 |
| 2004/0068621 A1* | 4/2004 | Van Doren | ......... | G06F 12/0828 711/144 |
| 2005/0125607 A1* | 6/2005 | Chefalas | ............ | G06F 12/0862 711/113 |
| 2007/0008328 A1* | 1/2007 | MacWilliams | ..... | G06F 12/0646 345/530 |
| 2009/0037682 A1* | 2/2009 | Armstrong | .......... | G06F 12/1475 711/164 |
| 2009/0063548 A1 | 3/2009 | Rusher et al. | | |
| 2009/0094413 A1* | 4/2009 | Lehr | ..................... | G06F 3/0605 711/112 |
| 2009/0228648 A1* | 9/2009 | Wack | .................. | G06F 11/1092 711/114 |
| 2009/0271472 A1* | 10/2009 | Scheitler | ................. | G06F 9/485 709/202 |
| 2009/0282101 A1* | 11/2009 | Lim | ...................... | G06F 9/5077 709/203 |
| 2010/0046267 A1* | 2/2010 | Yan | ........................ | G11C 16/24 365/51 |
| 2010/0050016 A1* | 2/2010 | Franklin | ............. | G06F 11/0727 714/6.32 |
| 2010/0106926 A1* | 4/2010 | Kandasamy | ........ | G06F 12/1458 711/163 |
| 2010/0125712 A1* | 5/2010 | Murase | ............... | G06F 11/1458 711/162 |
| 2010/0161928 A1* | 6/2010 | Sela | ..................... | G06F 12/1441 711/163 |
| 2010/0332479 A1* | 12/2010 | Prahlad | ................. | G06F 17/302 707/741 |
| 2010/0332780 A1* | 12/2010 | Furuya | .................. | G06F 3/0689 711/162 |
| 2011/0066668 A1* | 3/2011 | Guarraci | .......... | G06F 17/30233 707/831 |
| 2011/0154103 A1* | 6/2011 | Bulusu | ................ | G06F 11/1658 714/6.23 |
| 2011/0167194 A1 | 7/2011 | Scales et al. | | |
| 2011/0202735 A1* | 8/2011 | Kono | ................... | G06F 11/1451 711/162 |
| 2011/0302474 A1 | 12/2011 | Goss et al. | | |
| 2011/0307745 A1* | 12/2011 | McCune | ............ | G06F 17/30221 714/54 |
| 2012/0131232 A1* | 5/2012 | Brownlow | .......... | G06F 13/4221 710/10 |
| 2012/0198107 A1* | 8/2012 | McKean | ................. | G06F 13/18 710/40 |
| 2012/0246381 A1 | 9/2012 | Kegel et al. | | |
| 2013/0007373 A1* | 1/2013 | Beckmann | ............ | G06F 12/126 711/136 |
| 2013/0046949 A1* | 2/2013 | Colgrove | ............. | G06F 3/0608 711/170 |
| 2013/0055253 A1* | 2/2013 | Jubran | .................... | G06F 9/455 718/1 |
| 2013/0067161 A1* | 3/2013 | Chandra | ............ | G06F 13/12 711/114 |
| 2013/0080805 A1* | 3/2013 | Vick | ..................... | G06F 8/4432 713/320 |
| 2013/0086268 A1* | 4/2013 | Sloma | ..................... | G06F 9/455 709/226 |
| 2013/0111129 A1* | 5/2013 | Maki | ..................... | G06F 3/0611 711/117 |
| 2013/0152097 A1* | 6/2013 | Boctor | .................... | G06F 9/505 718/103 |
| 2013/0325830 A1 | 12/2013 | Verma et al. | | |
| 2013/0326270 A1* | 12/2013 | Chen | ................... | G06F 11/2089 714/6.21 |
| 2013/0332660 A1* | 12/2013 | Talagala | ........... | G06F 12/0246 711/103 |
| 2013/0332684 A1* | 12/2013 | Kandiraju | ........... | G06F 12/0246 711/161 |
| 2014/0003114 A1* | 1/2014 | Pellizzer | ............. | H01L 27/2481 365/63 |

OTHER PUBLICATIONS

Merrifield, T. et al,: "CONVERSION: Multi-version Concurrency Control for Main Memory Segments"; Mar. 8, 2013; 13 pages.

* cited by examiner

MEMORY DATA VERSIONING

BACKGROUND

Memory can be used in a system for storing data. A memory controller can be used to manage the access (read or write) of the data in the memory. In some examples, a processor or other requestor can generate a request for data. In response to the request, the memory controller can issue respective command(s) to the memory to perform the requested operation.

BRIEF DESCRIPTION OF THE DRAWINGS

Some implementations are described with respect to the following figures.

DETAILED DESCRIPTION

Different versions of a given unit of data can be stored in memory for various purposes. As used here, "memory" can refer to a memory device, an array of storage cells in a memory device, a memory module that can include multiple memory devices, or a memory subsystem that can include multiple memory modules. A memory can be implemented using memory according to any or some combination of the following different types: a dynamic random access memory (DRAM), a static random access memory (SRAM), a flash memory, a torque spin memory, a phase change memory, a memristor memory, a magnetic disk-based memory, an optical disk-based memory, and so forth.

In some examples, multiple versions of a given unit of data can be produced by performing checkpointing. Checkpointing refers to storing a known good state of data to memory at respective time points. A data checkpoint can refer to a version of data at a respective time point. If an unrecoverable error is experienced in a system, a requestor can use checkpointed data to recover to the last known good state of the data.

In further examples, multiple versions of a given unit of data can be produced by creating multiple logs that contain transactions that modify data. As an example, an application may log a certain number of updates of data in memory. After logging the certain number of updates in a log, a new version of the log can be created to log further updates. In such examples, the multiple logs constitute the different versions of data. In case of an unrecoverable error, data can be rolled back to an earlier state, and the updates in a respective log can be replayed to perform the updates reflected in the log.

Other examples of employing multiple versions of a given unit of data are described further below.

Maintaining multiple versions of data may be associated with increased complexity in the control logic that is used for tracking the multiple versions and to determine which of the multiple versions to select for use. In accordance with some implementations, techniques or mechanisms are provided to allow more efficient use of multiple versions of data in memory. In some implementations, selection of one of the multiple versions of data in memory can be accomplished based on control information in a transaction request. Different values of the control information in the transaction request would cause selection of different ones of the multiple versions of data in memory.

A transaction request can specify performance of a transaction with respect to data in memory. A transaction can refer to a unit of operation that is performed between endpoints (e.g. between a requestor and a memory).

Figure 1:
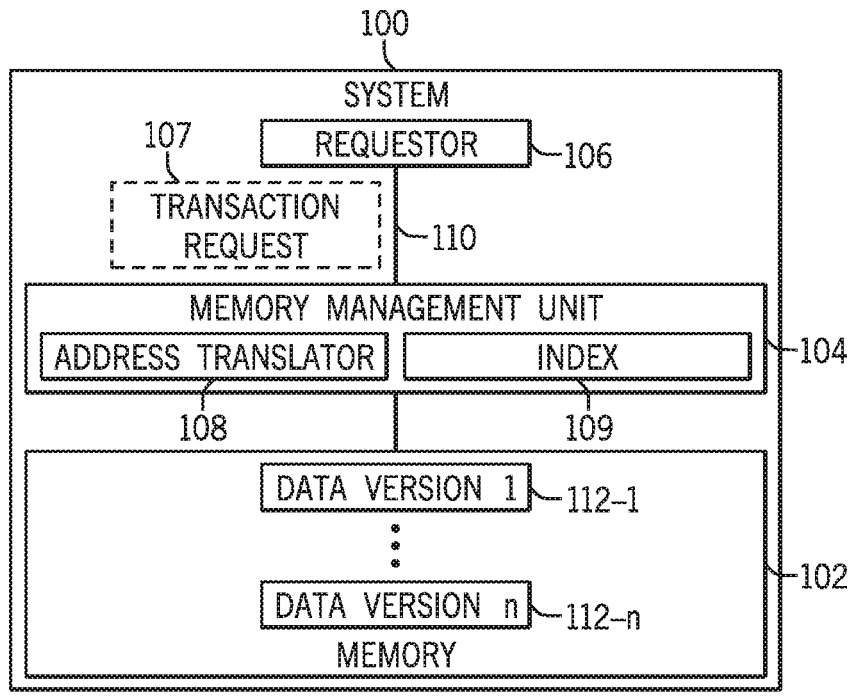
FIG. 1 is a block diagram of an example system including a memory management unit, according to some implementations.

FIG. 1 is a block diagram of an example system 100 that includes a memory 102, a memory management unit 104, and a requestor 106. As noted above, the memory 102 can be implemented as a memory device, an array of storage cells in a memory device, a memory module including multiple memory devices, or a memory subsystem including multiple memory modules. In some examples, the memory management unit 104 can be integrated with a memory device or memory module. The memory management unit 104 is used to manage access of the memory 102.

As depicted in FIG. 1, a requestor 106 (e.g. a processor, an input/output device, etc.) in the system 100 can issue a transaction request 107 that involves access of data in the memory 102. The transaction request 107 can be a read request to read data, a write request to write data, a rollback request (to rollback data to a previous version), a request for data recovery, a request to perform a computation, or another type of request. The transaction request 107 can be issued by a memory controller (not shown in FIG. 1) associated with the requestor 106, and is received by the memory management unit 104, which includes a media controller that issues corresponding command(s) to the memory 102 to access data of the memory 102. A further discussion of a memory controller and a media controller is provided in connection with FIG. 4 below.

The transaction request 107 can include control information, which can include a memory address, and other information. Such other information of the control information in the transaction request 107 can include a switching identifier that identifies an endpoint (source or destination) of a transaction over a communication fabric 110 (between the requestor 106 and the memory management unit 104) that can include one or multiple switches. A switch can refer to a relay engine to relay transactions between interfaces. The communication fabric 110 may provide point-to-point communication between endpoints (e.g. the requestor 106 and the memory management unit 104) or can provide switched communications accomplished using one or multiple switches.

Note that the communication fabric 110 can connect the requestor 106 to multiple memory management units 104. Also, although just one requestor 106 is depicted in FIG. 1, there may be multiple requestors connected to the communication fabric 110. Also, although just one communication fabric 110 is depicted in FIG. 1, there can be additional communication fabrics to interconnect other requestors and memory management units.

A switching identifier can include a source switching identifier (SSID), which is used to identify a source of a transaction, or a destination switching identifier (DSID), which is used to identify a destination of a transaction. For each instance of a communication fabric (e.g. 110 in FIG. 1), an SSID can uniquely identify a given source, and a DSID can uniquely identify a given destination.

An address translator 108 in the memory management unit 104 can produce, based on the control information in the transaction request 107, a corresponding physical resource address that identifies a location in the memory 102. For example, the address translator 108 can produce a physical resource address from one or some combination of the following control information: a memory address in an address field in the transaction request, an SSID in an SSID field in the transaction request, a DSID in a DSID field in the transaction request, or other information in some other field in the transaction request.

Different values of the control information can be mapped by the address translator 108 to different physical resource addresses (which identify different locations in the memory 102). The different locations in the memory contain different versions 112-1 to 112-*n* of a given unit of data in the memory 102. By using the address translator 108 to translate control information of the transaction request 107 to one of multiple data versions 112-1 to 112-*n*, a convenient and relatively simple technique or mechanism is provided to selectively access one of multiple data versions for the transaction request 107.

In some implementations, the memory management unit 104 and the memory 102 can be part of respective separate modules. In other implementations, the memory management unit 104 and the memory 102 can be part of the same memory module. In such latter implementations, the memory management unit 104 can be implemented in the memory module's control address space, while the memory 102 is implemented in the memory module's data address space. A control address space can refer to an address space in which control data (e.g. control data associated with management of the memory 102) is stored. A data address space can refer to an address space in which user data or application data is stored.

Providing the memory management unit 104 in the memory module's control address space allows for any updates of control data structures associated with the memory management unit 104 to be performed by just trusted entities, such as an operating system, a hypervisor, a management engine, and so forth. On the other hand, the content of the memory 102 in the memory module's data address space can be freely modified by various requestors.

Although not shown, the memory management unit 104 can include other elements in addition to the address translator 108. For example, the memory management unit 104 can include address mapping tables (or more generally, address mapping data structures). Each address mapping table maps a memory address to a corresponding physical page of memory, where a page of memory can refer to a segment in the memory 102 of a given size. The memory management unit 104 can also include control structures to manage various tables, including the memory mapping tables.

Figure 2:
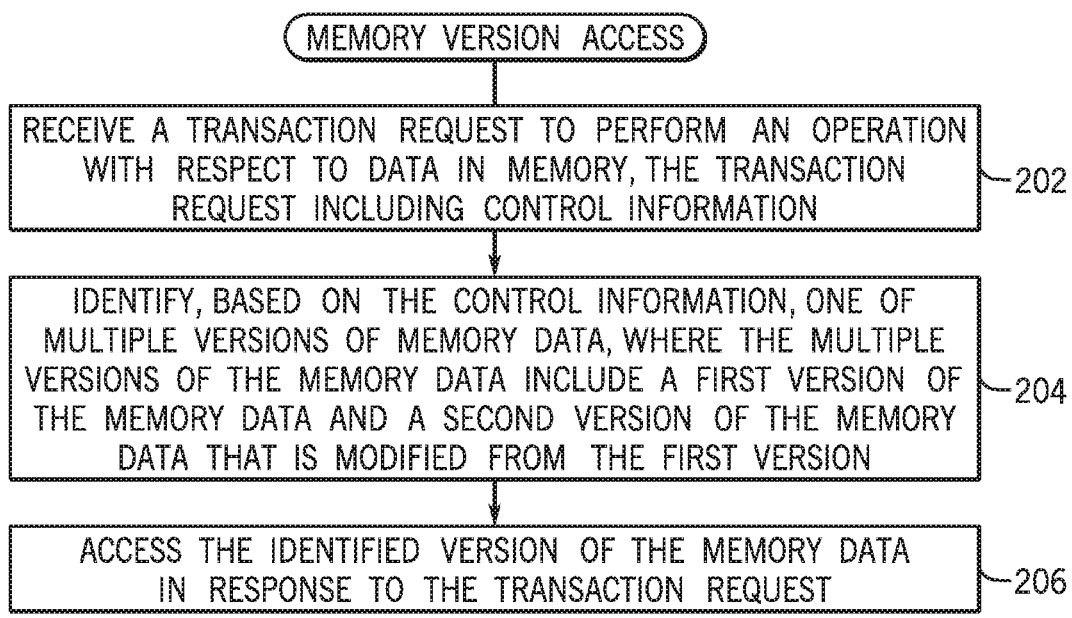
FIG. 2 is a flow diagram of a process, according to some implementations.

FIG. 2 is a flow diagram of a process according to some implementations. The process can be performed by the memory management unit 104, for example. The memory management unit 104 receives (at 202) a transaction request to perform an operation with respect to data in the memory 102, where the transaction request includes control information.

The memory management unit identifies (at 204), based on the control information, one of the multiple data versions 112-1 to 112-*n*. The multiple data versions 112-1 to 112-*n* include a first version of a given unit of data and a second version of the given unit of data that is modified from the first version of the given unit of data.

The memory management unit accesses (at 206) the identified data version in response to the transaction request. The access can be a read access, a write access, or some other type of access.

The identifying (at 204) can be performed by using the address translator 108 in the memory management unit 104, which produces a physical resource address based on control information in the received transaction request. In some examples, the address translator 108 can perform a lookup of an index (e.g. 109 in FIG. 1) or other translation data structure using the control information (e.g. memory address, SSID, and/or DSID). The lookup of the index 109 produces a respective physical resource address. Note that the index 109 can be changed dynamically, such that the mapping between control information and data versions can change over time.

In other examples, the address translator 108 can apply a function (e.g. hash function or other type of function) on the transaction's control information to produce an output that corresponds to the physical resource address. In further examples, other techniques for producing a physical resource address from control information in a transaction request can be employed.

Depending upon the granularity (size) of each data version 112-1 to 112-*n*, the lower n bits of the memory address in the address field of the control information of the transaction request can be masked (disregarded) by the address translator 108.

The memory management unit 104 can be instructed, such as by a requestor, to create a new data version in the memory 102. Alternatively, the memory management unit can 104 itself make a decision to create a new data version, such as in response to receiving a request to modify data in the memory 102. To create a new data version, the memory management unit 104 allocates a corresponding memory resource in the memory 102, and updates content of various data structures in the memory management unit 104, such as the address mapping tables and the index used by the address translator 108. The allocated memory resource can include a location of a specified size in the memory 102.

Once a new data version is created, current and subsequent transactions can be executed against the new data version. Alternatively, a requestor or multiple requestors can execute multiple transactions in parallel with respect to multiple respective data versions.

Although the present discussion refers to maintaining data versions of a given unit of data in a data address space, it is noted that multiple versions of data can also be provided in a control address space.

In some examples, to avoid race conditions, the memory management unit 104 may temporarily hold off of transaction processing until a new data version is created. To avoid delaying transactions for too long a time period, the temporary holding of transaction processing can be performed with respect to individual blocks of a memory resource that is used for holding the newly created data version. In such latter examples, to create a new data version, respective blocks of the corresponding memory resource are allocated. As each block of the memory resource is allocated, any transaction targeting this block will be temporarily held, while remaining transactions that target other blocks of the memory resource for the new data version can continue to process normally.

A new data version can also be created prior to a memory resource being made available to a requestor. Alternatively, a new data version can be created in the background using a combination of local buffer copy or buffer management operations and atomic updates to transparently migrate subsequent transactions to the new data version. This can be accomplished by setting up multiple data versions that are mapped to the same physical resource address. The address space for one of the existing data versions can be recycled for the new data version, with the foregoing operations used for migrating transactions to the new data version.

Figure 3:
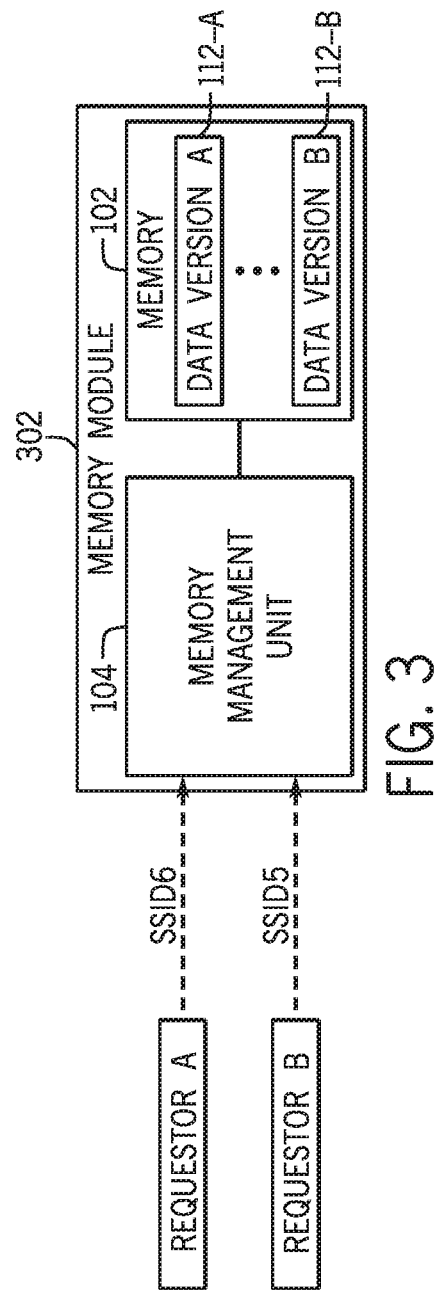
FIG. 3 is a schematic diagram illustrating access of different versions of data by different requestors, according to some implementations.

FIG. 3 is a schematic diagram showing concurrent access by different requestors (requestor A and requestor B) of respective different data versions 112-A and 112-B stored in the memory 102. The memory 102 is included in a memory module 302, which also includes the memory management unit 104.

In some examples, different SSIDs that respectively identify requestor A and requestor B can be used by the memory management unit 104 to map to the different data versions 112-A and 112-B. For example, the SSID of requestor A can be SSID6, while the SSID of requestor B can be SSID5. SSID6 is mapped by the memory management unit 104 to the physical resource address of data version 112-A, while SSID5 is mapped by the memory management unit 104 to the physical resource address of data version 112-B. In this manner, multiple requestors can access, in parallel, the different data versions of a given unit of data.

Figure 4:
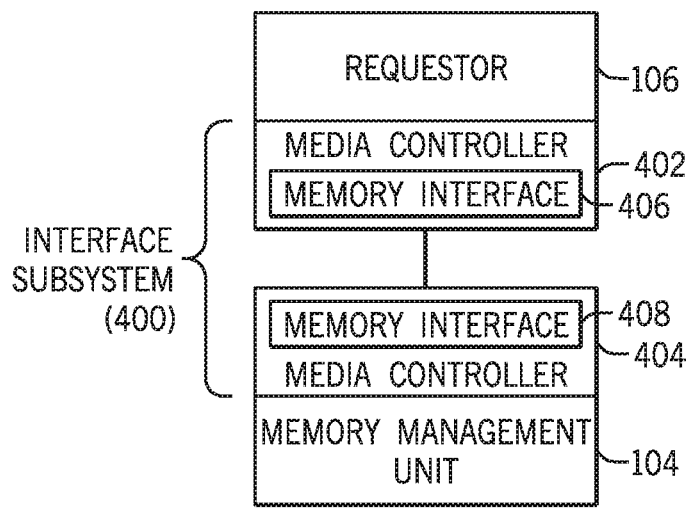
FIG. 4 is a block diagram of an arrangement including a requestor that is associated with a memory controller, and a memory management unit that is associated with a media controller, in accordance with some implementations.

FIG. 4 is a block diagram of an arrangement that includes the requestor 106 and the memory management unit 104, along with an interface subsystem 400 between the requestor 106 and the memory management unit 104. The requestor 106 is associated with a memory controller 402 that interacts with a distinct media controller 404 associated with the memory management unit 104. The memory controller 402 can be part of the requestor 106 or can be separate from the requestor 106. Similarly, the media controller 404 can be part of or separate from the respective memory management unit 104. Note that the memory controller 402 can interact with multiple media controllers, or alternatively, the media controller 404 can interact with multiple memory controllers.

The memory controller 402 together with the media controller 404 form the interface subsystem 400. By using the interface subsystem 400, the memory controller 402 that is associated with the requestor 106 does not have to be concerned with issuing commands that are according to specifications of respective memories (e.g. 102 in FIG. 1). For example, a memory can be associated with a specification that governs the specific commands (which can be in the form of signals) and timings of such commands for performing accesses (read access or write access) of data in the memory. The memory controller 402 can issue a transaction request that is independent of the specification governing access of a specific memory. Note that different types of memories may be associated with different specifications. The transaction request does not include commands that are according to the specification of the memory that is to be accessed.

A transaction request from the memory controller 402 is received by a respective media controller 404, which is able to respond to the transaction request by producing command(s) that is (are) according to the specification governing access of a target memory. For example, the command can be a read command, a write command, or another type of command, which has a format and a timing that is according to the specification of the target memory. In addition to producing command(s) responsive to a transaction request from the memory controller 402, the media controller 404 is also able to perform other tasks with respect to a memory. For example, if the memory is implemented with a DRAM, then the media controller 404 is able to perform refresh operations with respect to the DRAM. A storage cell in a DRAM gradually loses its charge over time. To address this gradual loss of charge in a storage cell, a DRAM can be periodically refreshed, to restore the charge of storage cells to their respective levels.

In other examples, if a memory is implemented with a flash memory, then the media controller 404 can include wear-leveling logic to even out the wear among the storage cells of the memory. In addition, the media controller 404 can perform other media-specific operations with respect to the memory, such as a data integrity operation (e.g. error detection and correction), a data availability operation (e.g. failover in case of memory error), and so forth. The media controller 404 can also perform power management (e.g. reduce power setting of the memory when not in use), statistics gathering (to gather performance statistics of the memory during operation), and so forth.

The memory controller 402 includes a memory interface 406, which can include a physical layer that governs the communication of physical signals over a link between the memory controller 402 and a respective media controller 404. The memory interface 406 can also include one or multiple other layers that control the communication of information over a link between the memory controller 402 and a respective media controller 404.

Each media controller 404 similarly includes a memory interface 408, which interacts with the memory interface 406 of the memory controller 402. The memory interface 408 can also include a physical layer, as well as one or multiple other layers.

In some examples, a link between the memory interface 406 of the memory controller 402 and the memory interface 408 of a media controller 404 can be a serial link. In other examples, the link can be a different type of link. Also, although not shown, a link can include one or multiple switches to route transactions between the memory controller 402 and the media controller 404.

The interface subsystem 400 separates (physically or logically) memory control into two parts: the memory controller 402 and the media controller(s) 404. Note that the memory controller 402 and the media controller(s) 404 can be physically in separate devices or can be part of the same device. By separating the memory control into two parts, greater flexibility can be achieved in a system that includes different types of memories. The memory controller 402 does not have to be concerned with the specific types of memories used, since transaction requests issued by the memory controller 402 would be the same regardless of the type of memory being targeted. By splitting the memory controller 402 from the media controllers 402, development of the memory controller 402 can be simplified.

The interface subsystem 400 shown in FIG. 4 can also be used to perform communications between other types of components in a system.

The following describes various examples in which multiple data versions may be employed.

Figure 5:
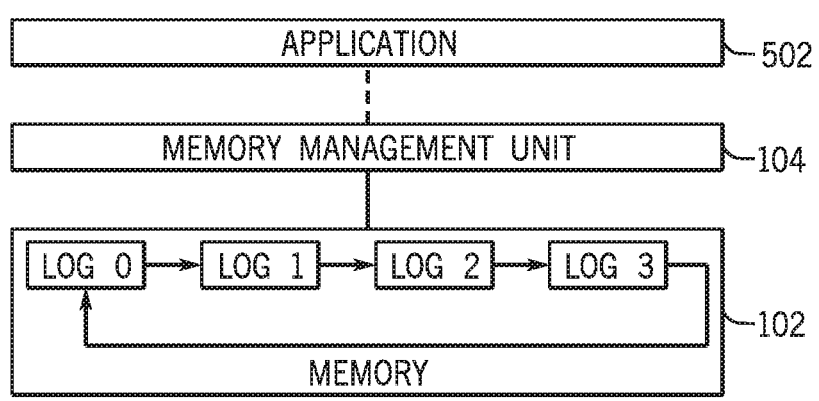
FIG. 5 is a schematic diagram of accessing multiple logs using memory data versioning, according to some implementations.

First examples involve logging, in which a log is created that contains transactions that modify data. As shown in FIG. 5, an application 502 (which can be executable on a processor) can perform logging to enable error recovery. Multiple logs (log 0, log 1, log 2, and log 3 shown in the example of FIG. 5) can be created for the application 502, and stored in the memory 102. Each log includes a respective set of transactions that modify given data. In the example of FIG. 5, the different logs constitute the different versions of data that can be selectively accessed by the application 502. The logs can be created at different points in time. For example, the application 502 can log N (N≥1) transactions in a first log. After logging such transactions, the application 502 can then log N further transactions in a second log. Each of the logs can correspond to respective checkpointed data that represent known good states of data at respective different time points. Checkpointing is discussed further below.

When a data error occurs, the application 502 can roll back data to a known good state (e.g. to data of one of the checkpoints) and can then replay subsequent transactions that modify the rolled back data, where the subsequent transactions are contained in respective one or multiple logs. When rollback is to be performed (in response to a rollback request received by the memory management unit 104), the memory management unit 104 can select an earlier log for access (by mapping control information in the rollback request to a selected one of the logs), and the application 502 can proceed to replay all subsequent transactions in the earlier log and any subsequent logs. The selection of a log by the memory management unit 104 can be based on control information included in a rollback request from the application 502, for example.

Further examples associated with maintaining multiple data versions involve checkpointing. Checkpointing refers to storing a known good state of data to memory at respective time points. A data checkpoint can refer to a version of data at a respective time point, which can be used by an application for error recovery. Data checkpoints can be stored in volatile memory or persistent memory. The memory management unit 104 can use control information in a request associated with retrieving checkpointed data to select one of multiple data checkpoints.

The multiple versions of data created due to checkpointing can be multiple versions of the entire memory resource for a given requestor, or of a subset of the memory resource. The memory resource for the given requestor refers to the portion of memory allocated to the given requestor. A checkpoint created for a subset of the memory resource for the given requestor can include just active pages of the given requestor (the pages in memory that are currently be accessed). Checkpointing a subset of the memory resource for the given requestor may be more efficient, since downtime of the given requestor during rollback to a checkpoint can be reduced.

In response to a request for data recovery received by the memory management unit 104, the memory management unit 104 can map control information in the request for data recovery to one of the checkpointed data.

Figure 6:
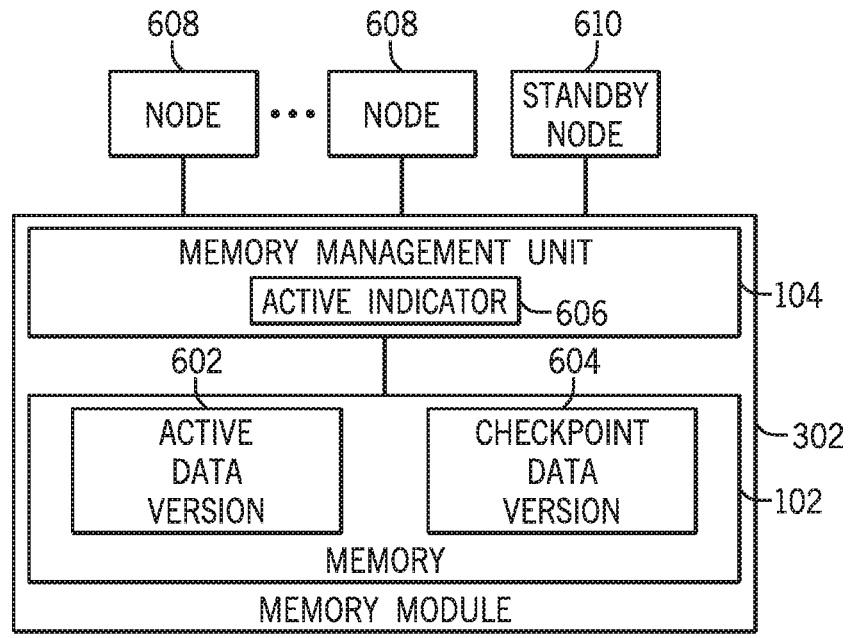
FIG. 6 is a schematic diagram of an example system including nodes and a memory module that stores check-pointed data, according to some implementations.

FIG. 6 shows an example in which the memory 102 stores an active data version 602 (the version of a given unit of data that is actively being accessed by a requestor), and a checkpoint data version 604 (the version of the given unit of data that was checkpointed at a respective point in time). Although just one checkpoint data version 604 is shown in FIG. 6, note that there can be multiple checkpoint data versions for different time points in other examples. The memory management unit 104 can store an active indicator 606 for indicating which of the data versions 602 an 604 is active.

In the example of FIG. 6, various requestors of the active data version 602 or checkpoint data version 604 are represented as nodes 608, where a node 608 can include a processor, a computer, or other device. FIG. 6 also shows a standby node 610, which can be used to replace one of the nodes 608 in case of failure of the node 608. In some examples, a topology can employ an M+1 strategy, where for every M active nodes 608, one additional node is configured to act as a standby node. In other examples, more than one standby node can be used. As further examples, one of the active nodes 608 can be a standby node for another of the active nodes 608.

The couplings between each of the nodes 608, 610 and the memory management unit 104 in the memory module 302 can be based on the interface subsystem 400 discussed above in connection with FIG. 4.

During failover from a failed active node 608 to the standby node 610, the standby node 610 can acquire attributes of the failed active node 608. The attributes of the failed active node 608 can specify a configuration of the failed active node, for example. The attributes can be stored as part of the active data version 602 or checkpoint data version 604, or alternatively, in another repository. Acquiring the attributes of the standby node 610 allows the standby node 610 to operate according to the configuration of the failed active node 608.

Failing over from the failed active node 608 to the standby node 610 can cause the standby node 610 to access the checkpoint data version 604 in the memory 102, which contains data at a known good state prior to failure of the failed active node 608. Selection of the active data version 602 or checkpoint data version 604 can be performed by the memory management unit 104, in response to a transaction request from the standby node 610.

Figure 7:
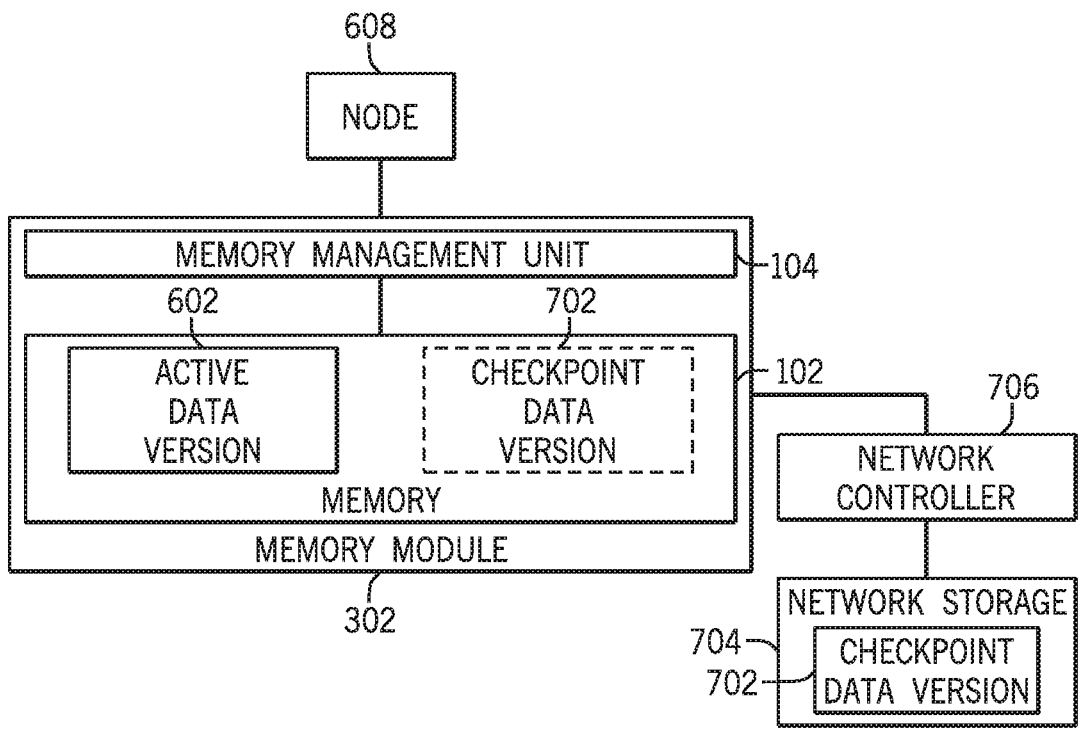
FIG. 7 is a schematic diagram of an example system including a node, a memory module, a network controller, and a network storage to store checkpointed data, according to further implementations.

FIG. 7 shows another example topology, in which the active data version 602 accessed by the node 608 is stored in the memory 102 of the memory module 302. However, in the example topology of FIG. 7, checkpoint data version 702 is stored in a network storage 704 accessible through a network controller 706. The coupling between the network controller 706 and each of the memory management unit 104 and the network storage 704 can be according to the interface subsystem 400 depicted in FIG. 4.

If the checkpoint data version 702 is to be used for recovering from a data error, the checkpoint data version 702 can be retrieved from the network storage 704 and copied to the memory 102.

Additional examples associated with employing multiple data versions involves parallel operation of applications or other requestors of data. Traditionally, when multiple applications (or other requestors) operate in parallel and access common data, the requestors are configured to become aware of address ranges, messaging, and other information associated with other requestors operating on the common data.

Figure 8:
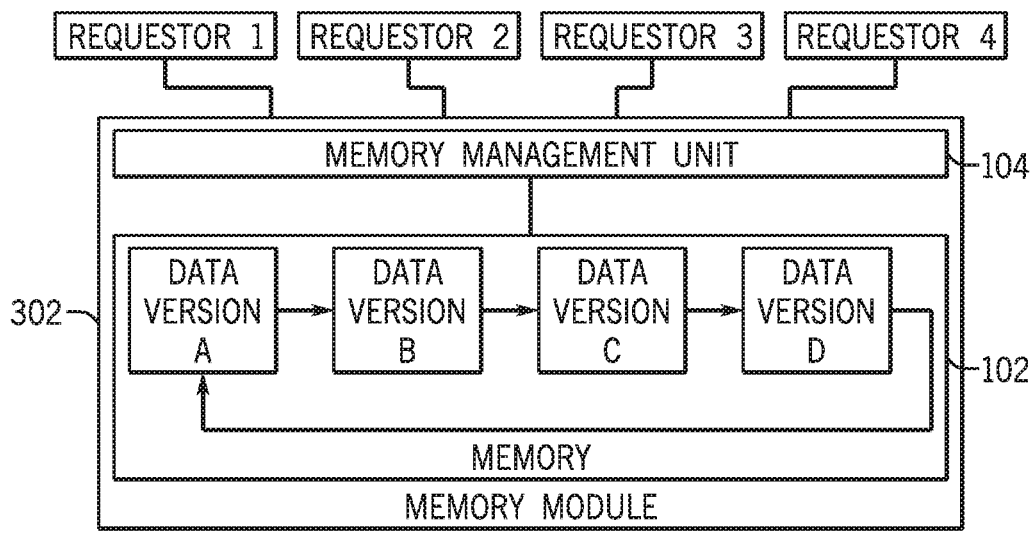
FIG. 8 is a schematic diagram of accessing multiple data versions in parallel by multiple requestors, according to additional implementations.

In accordance with some implementations, by employing memory data versioning, parallel requestors would no longer have to be made aware of each other. Multiple data versions of given data can be transparently cycled or shuffled among the requestors. An example shown in FIG. 8 includes requestors 1, 2, 3, and 4, which are able to selectively access data versions A, B, C, and D stored in the memory 102 in the memory module 302.

When a given requestor completes its work on a particular data version, then the particular data version can be shuffled for use by the next requestor. Instead of having to explicitly transfer a data version between the requestors, the memory management unit 104 can select which data version to access for a request of a given requestor. In this manner, coordination among the requestors does not have to be performed, beyond understanding data layouts employed by the requestors. By eliminating a synchronization mechanism or message passing among the requestors, complexity can be reduced while still allowing requestors to operate in parallel on given data.

The mapping between requestors 1, 2, 3, and 4, and respective data versions A, B, C, and D, which can change, can be provided by the memory management unit 104. Each requestor can be associated with a respective unique SSID; the different SSIDs can be mapped by the memory management unit 104 to different ones of the data versions. Shuffling the data versions A, B, C, and D across the requestors 1, 2, 3, and 4 allow the requestors to access different ones of the data versions at different times. The shuffling can be performed by modifying a translation data structure (e.g. index 109 in FIG. 1) in the memory management unit 104, for example.

Figure 9:
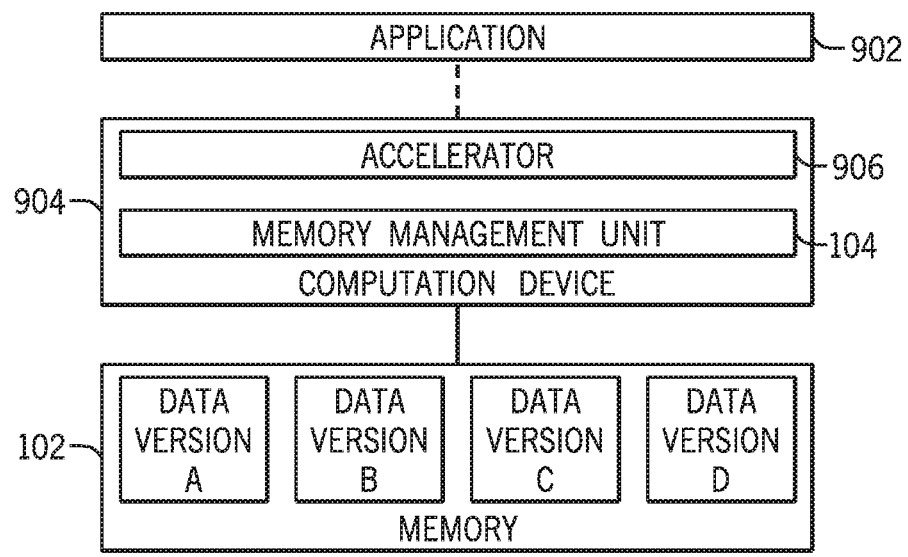
FIG. 9 is a schematic diagram of an accelerator performing computations with respect to different memory data versions, according to further implementations.

Other examples associated with employing multiple data versions involves providing alternative execution paths by an application, such as an application 902 depicted in FIG. 9. The application 902 can be executable on a processor.

The application 902 interacts with a computation device 904, which can include an accelerator 906 and the memory management unit 104. The accelerator can perform calculations on data, or can otherwise manipulate data (e.g. sort data, merge data, join data, etc.). Performing a calculation on or manipulation of the data can cause a data set to become modified.

In the example of FIG. 9, the application 902 can initially load the data set, which the memory management unit 104 can store into the memory 102 as data version A.

The accelerator 906 may be configured to perform a set of alternative calculations and/or data manipulations, which can produce different results. The application 902 may be unaware of how many alternative calculations and/or manipulations will be performed by the accelerator 906, and may only know that one of the results produced by the alternative calculations and/or manipulations is the correct result.

In response to implicit or explicit signaling from the application 902, the accelerator 906 can create multiple data versions of the data set (such as data versions B, C, and D in addition to the initially loaded data version A). The additional data versions B, C, and D are stored by the memory management unit 104 into the memory 102. A data version may replicate the entire data set or only a subset of the data set that will be modified. Creation of the multiple data versions corresponding to the alternative calculations and/or manipulations may be performed on-demand to avoid a large startup time.

The accelerator 906 may execute multiple alternative calculations and/or manipulations by reloading the data set from data version A to each of data versions B, C, and D, and then performing the respective calculation and/or manipulation on each of the respective data versions B, C, and D.

The mapping between a current computation of the accelerator 906 and a respective data version can be provided by the memory management unit 104, in similar fashion as discussed above. For example, a request of an accelerator 906 to begin a respective computation can include control information that is used by the accelerator 906 to map to one of the data versions.

The foregoing may be repeated until either the accelerator 906 finds the correct result (based on some specified criterion or criteria) or time expires. When the correct alternative is found, the memory management unit 104 can map the corresponding correct data version to the application's view of memory (the entire memory range or only those subranges that were modified may be mapped). The application is informed of the success (or failure) of the computations of the accelerator 906, and the application 902 can access the mapped data version to acquire the results.

The memory management unit 104 discussed above in the various implementations can be implemented as hardware or as machine-executable instructions executable on hardware. For example, the instructions can be loaded for execution on a processor. A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a memory management unit, a transaction request to perform an operation with respect to data in memory, the transaction request including control information;

identifying, by the memory management unit based on the control information, one of a plurality of versions of a given memory data, wherein the plurality of versions of the given memory data include a first version of the given memory data and a second version of the given memory data that is modified from the first version;

accessing, by the memory management unit, the identified version of the given memory data in response to the transaction request, wherein the plurality of versions of the given memory data are accessible by a plurality of requestors in parallel; and shuffling the plurality of versions of the given memory data across the plurality of requestors such that the plurality of requestors access different ones of the plurality of versions of the given memory data at different times, wherein the shuffling is performed by modifying a translation data structure in the memory management unit.

2. The method of claim 1, wherein accessing the identified version of the given memory data comprises reading or writing the identified version of the given memory data.

3. The method of claim 1, wherein the identifying comprises generating a physical resource address based on the control information in the transaction request, wherein different values of the control information map to different physical resource addresses that specify different locations in the memory.

4. The method of claim 1, wherein identifying one of the plurality of versions of the given memory data is based on an address field in the control information.

5. The method of claim 1, wherein identifying one of the plurality of versions of the given memory data is based on an identifier in the control information.

6. The method of claim 1, wherein the transaction request is received from a first requestor associated with a first value in the control information, the method further comprising:

receiving, by the memory management unit, a second transaction request to perform an operation with respect to the given memory data in the memory, the second transaction request including control information having a second value;

identifying, by the memory management unit based on the second value of the control information in second transaction request, another of the plurality of versions of the given memory data; and accessing, by the memory management unit in response to the second transaction request, the identified another version of the given memory data.

7. The method of claim 1, wherein the plurality of versions of the given memory data are selected from among: logs of transactions, data of different checkpoints, and data versions produced from the given memory data due to different computations by a computation device.

8. The method of claim 1, wherein the transaction request is sent by a memory controller associated with a requestor, the method further comprising:

the memory controller interacting with a distinct media controller associated with the memory, the media controller to produce, in response to the transaction request, at least one command according to a specification of the memory.

9. A system comprising:

a memory to store a plurality of versions of given memory data, wherein the plurality of versions of the given memory data include a first version of the given memory data and a second version of the given memory data that is modified from the first version; and a memory management unit to:

receive a transaction request to perform an operation with respect to the given memory data in the memory;

map control information in the transaction request to one of the plurality of versions of the given memory data; and access, in response to the transaction request, the one of the plurality of versions of the given memory data, wherein the plurality of versions of the given memory data are accessible by a plurality of requestors in parallel; and shuffle the plurality of versions of the given memory data across the plurality of requestors such that the plurality of requestors access different ones of the plurality of versions of the given memory data at different times, wherein the shuffling is performed by modifying a translation data structure in the memory management unit.

10. The system of claim 9, wherein the transaction request includes at least one from among: a read request, a write request, a rollback request, and a request to perform a computation.

11. The system of claim 9, wherein the mapping is performed using a translation data structure that maps different values of the control information to different ones of the plurality of versions of the given memory data.

12. The system of claim 9, wherein the mapping is performed by using a function to produce an output in response to the control information.

13. An article comprising at least one non-transitory machine-readable storage medium storing instructions that upon execution cause a memory management unit to:

receive a transaction request to perform an operation with respect to data in memory, the transaction request including control information, the transaction request received from a memory controller associated with a requestor;

identify, based on the control information, one of a plurality of versions of a given memory data, wherein the plurality of versions of the given memory data include a first version of the given memory data and a second version of the given memory data that is modified from the first version; and access, in response to the transaction request, the identified version of the given memory data in the memory, wherein the accessing uses a media controller distinct from the memory controller, the media controller to produce, in response to the transaction request, at least one command according to a specification of the memory, wherein the plurality of versions of the given memory data are accessible by a plurality of requestors in parallel, the method further comprising:

shuffle the plurality of versions of the given memory data across the plurality of requestors such that the plurality of requestors access different ones of the plurality of versions of the given memory data at different times, wherein the shuffling is performed by modifying a translation data structure in the memory management unit.

14. The article of claim 13, wherein the identifying comprises generating a physical resource address based on the control information in the transaction request, wherein different values of the control information map to different physical resource addresses that specify different locations in the memory.

* * * * *